(12) United States Patent
Kinoe

(10) Patent No.: US 9,164,336 B2
(45) Date of Patent: Oct. 20, 2015

(54) ELECTRO-OPTICAL DEVICE AND ELECTRONIC APPARATUS

(71) Applicant: Seiko Epson Corporation, Tokyo (JP)

(72) Inventor: Yusuke Kinoe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 23 days.

(21) Appl. No.: 14/252,842

(22) Filed: Apr. 15, 2014

(65) Prior Publication Data

US 2014/0313448 A1 Oct. 23, 2014

(30) Foreign Application Priority Data

Apr. 23, 2013 (JP) ................. 2013-090049

(51) Int. Cl.
*G02F 1/1368* (2006.01)
*G02F 1/1362* (2006.01)
*G02F 1/1335* (2006.01)
*G02F 1/1333* (2006.01)

(52) U.S. Cl.
CPC .... *G02F 1/136209* (2013.01); *G02F 1/136277* (2013.01); *G02F 1/133509* (2013.01); *G02F 1/136286* (2013.01); *G02F 2001/133388* (2013.01)

(58) Field of Classification Search
CPC .............. G02F 1/136209; G02F 1/136286; G02F 2001/133388; G02F 1/136277; G02F 1/133509
USPC .............. 349/43, 46, 110, 139; 257/59, 72; 345/92

See application file for complete search history.

(56) References Cited

U.S. PATENT DOCUMENTS

| | | | |
|---|---|---|---|
| 6,433,841 B1 | 8/2002 | Murade et al. | |
| 6,611,301 B2 | 8/2003 | Murade | |
| 6,897,932 B2 | 5/2005 | Murade et al. | |
| 7,196,353 B2 | 3/2007 | Murade | |
| 7,999,897 B2 | 8/2011 | Oyamada | |
| 2008/0068364 A1* | 3/2008 | Park et al. | 345/206 |

FOREIGN PATENT DOCUMENTS

| | | |
|---|---|---|
| JP | 2001-296530 A | 10/2001 |
| JP | 2004-102256 A | 4/2004 |
| JP | 2005-301127 A | 10/2005 |
| JP | 2006-227142 A | 8/2006 |
| JP | 2009-265622 A | 11/2009 |
| JP | 2011-059374 A | 3/2011 |
| JP | 4798186 B | 10/2011 |

* cited by examiner

*Primary Examiner* — Dung Nguyen
*Assistant Examiner* — Tai Duong
(74) *Attorney, Agent, or Firm* — ALG Intellectual Property, LLC

(57) ABSTRACT

A liquid crystal device includes a first dummy pixel and a second dummy pixel adjacent to each other in an X direction, in which width of a first portion of a scanning line between a first transistor of the first dummy pixel and a second transistor of the second dummy pixel is larger than width of a second portion of the scanning line between the second transistor and a third transistor of a pixel.

6 Claims, 10 Drawing Sheets

ELECTRO-OPTICAL DEVICE AND ELECTRONIC APPARATUS

BACKGROUND

1. Technical Field

The present invention relates to electro-optical devices, manufacturing methods for electro-optical devices, and electronic apparatuses.

2. Related Art

As an electro-optical device, such an electro-optical device is disclosed (Japanese Patent No. 4,798,186) that includes, on a substrate, an image display region where a plurality of pixels are arranged, a dummy region located in the circumference of the image display region where a plurality of dummy pixels are arranged, and a dummy pixel shielding film provided in the dummy region across the plurality of dummy pixels; further, in the disclosed electro-optical device, slits are provided in the dummy pixel shielding film for each of the dummy pixels.

According to the electro-optical device described in Japanese Patent No. 4,798,186, by providing the dummy pixel shielding film corresponding to opening regions of the dummy pixels, oblique light that enters the dummy region in an oblique direction, return light, or the like can be blocked. Therefore, display in the image display region is protected from being affected by the oblique light, the return light, or the like.

In addition, according to the above electro-optical device, because slits are provided in the dummy pixel shielding film for each of the dummy pixels, even if the dummy pixel shielding film is formed using a light blocking film material whose coefficient of thermal expansion is different from the coefficient of thermal expansion of the substrate, an interlayer insulation film, a semiconductor layer, or the like, it is possible to reduce a stress generated in the vicinity of the dummy pixel shielding film during or after the manufacture of the electro-optical device and to prevent generation of a crack.

In an electro-optical device, there is a case where a peripheral circuit configured to drive a plurality of pixels is provided in a region outside the dummy region. In the case where the dummy pixel shielding film disclosed in Japanese Patent No. 4,798,186 is applied to the electro-optical device having the above-mentioned peripheral circuit, arrangement densities of components disposed on the substrate, such as switching elements, wiring that is connected with the switching elements, and the like are different between the dummy region and the region where the peripheral circuit is provided. Accordingly, the stress generated during or after the manufacture of the electro-optical device is concentrated in a portion where the above different arrangement densities are present, whereby cracks are likely to be generated in the dummy pixel shielding film itself, an interlayer insulation film that covers the dummy pixel shielding film, or the like, starting from the portion where the different arrangement densities are present.

In particular, in the case where part of the dummy pixel shielding film is used as wiring, there is a risk that the wiring is cut due to the crack.

SUMMARY

An advantage of some aspects of the invention is to provide electro-optical devices, methods for manufacturing electro-optical devices, and electronic apparatuses including electro-optical devices, and the invention can be embodied as the following embodiments or application examples.

First Application Example

An electro-optical device according to a first application example is an electro-optical device that includes a display region where a plurality of pixels are arranged in a first direction and a second direction intersecting with the first direction, a dummy pixel region including a plurality of dummy pixels that are arranged surrounding the display region, and a peripheral circuit region provided in the circumference of the dummy pixel region and including a peripheral circuit that controls and drives the plurality of pixels. The stated electro-optical device is characterized in that the device includes: a first transistor provided in a first dummy pixel which is closest to the peripheral circuit region; a second transistor provided in a second dummy pixel adjacent to the first dummy pixel on the opposite side to the peripheral circuit region in the first direction; a third transistor that is disposed adjacent to the second transistor in the first direction; and a gate wiring extended in the first direction and electrically connected with each of the first transistor, the second transistor and the third transistor. Further in the stated electro-optical device, width in the second direction of a first portion of the gate wiring between the first transistor and the second transistor is larger than width in the second direction of a second portion of the gate wiring between the second transistor and the third transistor.

In the electro-optical device according to this application example, because the width of the first portion of the gate wiring connected with the first transistor of the first dummy pixel that is closest to the peripheral circuit region is larger than the width of the second portion of the gate wiring connected with the second transistor of the second dummy pixel adjacent to the first dummy pixel in the first direction, even if arrangement densities of the components such as switching elements and wiring that is connected with the switching elements are different between the peripheral circuit region and the dummy pixel region so that a stress is caused to concentrate in a boundary portion between the peripheral circuit region and the dummy pixel region, leading to generation of a crack, it is possible to suppress the gate wiring from being cut due to the crack.

It is preferable that the electro-optical device according to the above application example further include a first dummy pixel shielding film for shielding the first dummy pixel from light and a second dummy pixel shielding film for shielding the second dummy pixel from light which are provided in the same layer as the gate wiring, and that a slit whose width is less than 1 μm be formed between the gate wiring and the first dummy pixel shielding film and between the gate wiring and the second dummy pixel shielding film.

According to this configuration, the stress applied to the gate wiring is reduced by providing the slit formed between the gate wiring and the first dummy pixel shielding film and between the gate wiring and the second dummy pixel shielding film. Further, because the width of the slit is less than 1 μm, it is possible to suppress the light blocking property to shield the first dummy pixel and the second dummy pixel from being degraded due to the slit.

In the electro-optical device according to the above application example, it is preferable that a distance between the slit and a first gate contact for electrically connecting the gate of the first transistor to the gate wiring be longer than a distance between the slit and a second gate contact for electrically connecting the gate of the second transistor to the gate wiring.

The gate contacts are provided passing through a gate insulation film that covers the gate wiring.

According to this application example, because the first gate contact is more distanced from the slit formed between the gate wiring and the first dummy pixel shielding film than the second gate contact, even if the stress is concentrated in the first portion of the gate wiring so as to generate a crack therein, the first gate contact can be suppressed from being affected by the crack.

In the electro-optical device according to the above application example, it is preferable that the gate wiring be formed using metal silicide.

According to this configuration, because the gate wiring is formed using metal silicide, it is possible for the gate wiring to block light that enters the respective semiconductor layers of the first transistor, the second transistor, and the third transistor. Since the metal silicide is unlikely to reflect entering light, light reflected by the gate wiring can be suppressed from entering the semiconductor layers. In other words, operations of the first through third transistors are suppressed from being unstable due to the light entering these transistors.

In the electro-optical device according to the above application example, it is preferable that respective gate electrodes of the first transistor, the second transistor, and the third transistor be formed using a conductive poly-silicon film.

According to this configuration, because the gate electrodes are formed using a conductive poly-silicon film having a lower coefficient of thermal expansion than metal such as aluminum, for example, cracks are unlikely to be generated in the gate electrodes and in the periphery thereof due to a thermal stress.

Second Application Example

A manufacturing method for an electro-optical device according to a second application example is a manufacturing method for an electro-optical device that includes a display region where a plurality of pixels are arranged in a first direction and a second direction intersecting with the first direction, a dummy pixel region including a plurality of dummy pixels that are arranged surrounding the display region, and a peripheral circuit region provided in the circumference of the dummy pixel region and including a peripheral circuit that controls and drives the plurality of pixels. The stated method includes: forming a gate wiring that is electrically connected with a first transistor, a second transistor, and a third transistor adjacent to each other in the first direction; forming an interlayer insulation film that covers the gate wiring; and forming of semiconductor layers in which a first semiconductor layer of the first transistor and a second semiconductor layer of the second transistor are each formed on the interlayer insulation film at locations overlapping with the gate wiring. Further, in the method, the first transistor is formed in a first dummy pixel which is closest to the peripheral circuit region; the second transistor is formed in a second dummy pixel adjacent to the first dummy pixel on the opposite side to the peripheral circuit region; and the forming of the gate wiring is carried out in which the gate wiring is formed so that width in the second direction of a first portion of the gate wiring between the first transistor and the second transistor is larger than width in the second direction of a second portion of the gate wiring between the second transistor and the third transistor.

According to the manufacturing method for the electro-optical device of this application example, because the forming of the gate wiring is carried out so that the width of the first portion of the gate wiring connected with the first transistor of the first dummy pixel that is closest to the peripheral circuit region is larger than the width of the second portion of the gate wiring connected with the second transistor of the second dummy pixel adjacent to the first dummy pixel in the first direction, even if arrangement densities of the components such as switching elements and wiring that is connected with the switching elements are different between the peripheral circuit region and the dummy pixel region so that a stress is caused to concentrate in a boundary portion between the peripheral circuit region and the dummy pixel region, leading to generation of a crack, it is possible to suppress the gate wiring from being cut due to the crack. This makes it possible to manufacture electro-optical devices at a high manufacturing yield.

In the manufacturing method for the electro-optical device according to the above application example, it is preferable that the forming of the gate wiring be carried out so that a first dummy pixel shielding film corresponding to the first dummy pixel and a second dummy pixel shielding film corresponding to the second dummy pixel are each formed in an island shape with a slit less than 1 μm in length between each dummy pixel shielding film and the gate wiring.

According to this method, by forming each of the first dummy pixel shielding film and the second dummy pixel shielding film in an island shape with a slit formed between each dummy pixel shielding film and the gate wiring in the forming of the gate wiring, it is possible to reduce the stress applied to the gate wiring, the first dummy pixel shielding film, the second dummy pixel shielding film, and the like. In addition, since the slit is less than 1 μm in width, the light blocking property to shield the first dummy pixel and the second dummy pixel is unlikely to be degraded even if the slit is provided. Accordingly, it is possible to reduce the stress applied to the gate wiring and the dummy pixel shielding films while ensuring the light blocking property for shielding the dummy pixels.

It is preferable that the manufacturing method for the electro-optical device according to the above application example further include: forming a gate insulation film which covers the first semiconductor layer and the second conductor layer; forming of gate contacts in which formed are a first gate contact and a second gate contact that pass through the gate insulation film to reach the gate wiring; and forming of gate electrodes in which formed are a first gate electrode that is in contact with the first gate contact and opposes a channel region of the first semiconductor layer via the gate insulation film and a second gate electrode that is in contact with the second gate contact and opposes a channel region of the second semiconductor layer via the gate insulation film. In the stated method, it is preferable that the forming of the gate contacts be carried out in which the first gate contact and the second gate contact are formed so that a distance between the first gate contact and the slit is longer than a distance between the second gate contact and the slit.

According to this method, in the forming of the gate contacts, the first gate contact is more distanced from the slit formed between the gate wiring and the dummy pixel shielding film than the second gate contact. Therefore, even if the stress is concentrated in the first portion of the gate wiring and a crack is generated therein, it is possible to suppress the crack from affecting the first gate contact.

In the manufacturing method for the electro-optical device according to the above application example, it is preferable that the forming of the gate wiring be carried out so that the gate wiring is formed using metal silicide.

According to this method, by forming the gate wiring using metal silicide, it is possible for the gate wiring to block light that enters the semiconductor layers of the first transistor, the second transistor, and the third transistor. In addition, because the metal silicide is unlikely to reflect entering light, it is possible to suppress the light reflected by the gate wiring from entering the semiconductor layers. Accordingly, operations of the transistors are suppressed from becoming unstable due to the light entering the first through third transistors. To rephrase, it is possible to manufacture, at a high manufacturing yield, electro-optical devices equipped with the first through third transistors capable of ensuring stable operations against the entering light.

In the manufacturing method for the electro-optical device according to the above application example, it is preferable that the forming of the gate electrodes be carried out so that the first gate electrode and the second gate electrode are formed using a conductive poly-silicon film.

According to this method, since the gate electrodes are formed using a conductive poly-silicon film having a lower coefficient of thermal expansion than metal such as aluminum, cracks due to the thermal stress are unlikely to be generated in the gate electrodes and the periphery thereof. In other words, electro-optical devices can be manufactured at a high manufacturing yield.

Third Application Example

An electronic apparatus according to a third application example includes the electro-optical device according to the above application examples.

Fourth Application Example

An electronic apparatus according to a fourth application example includes the electro-optical device formed through using the manufacturing method for the electro-optical device according to the above application examples.

According to these application examples, there is included the electro-optical device that has the gate wiring unlikely to be cut to ensure a stable device operation even if the stress is concentrated between the peripheral circuit region and the dummy pixel region, and that can be manufactured at a high manufacturing yield. Accordingly, it is possible to provide electronic apparatuses with excellent cost performance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, specific embodiments of the invention will be described based on the drawings. Note that the drawings used here illustrate the areas being described in an enlarged or reduced manner so that those areas can be recognized properly.

Note also that in the following embodiments, the phrase "on a substrate", for example, can refer to a constituent element being disposed directly on top of the substrate, a constituent element being disposed on top of the substrate with another constituent element provided therebetween, or part of the constituent element being disposed directly on top of the substrate while another part is disposed on top of the substrate with another constituent element provided therebetween.

First Embodiment

In a first embodiment, an active-matrix liquid crystal device equipped with thin-film transistors serving as switching elements of pixels will be cited and described as an example of an electro-optical device. This liquid crystal device is a device that can be favorably used as a light modulation unit (liquid crystal light valve) of a projection display apparatus (liquid crystal projector) to be explained later, for example.

Liquid Crystal Device

Figure 1A:
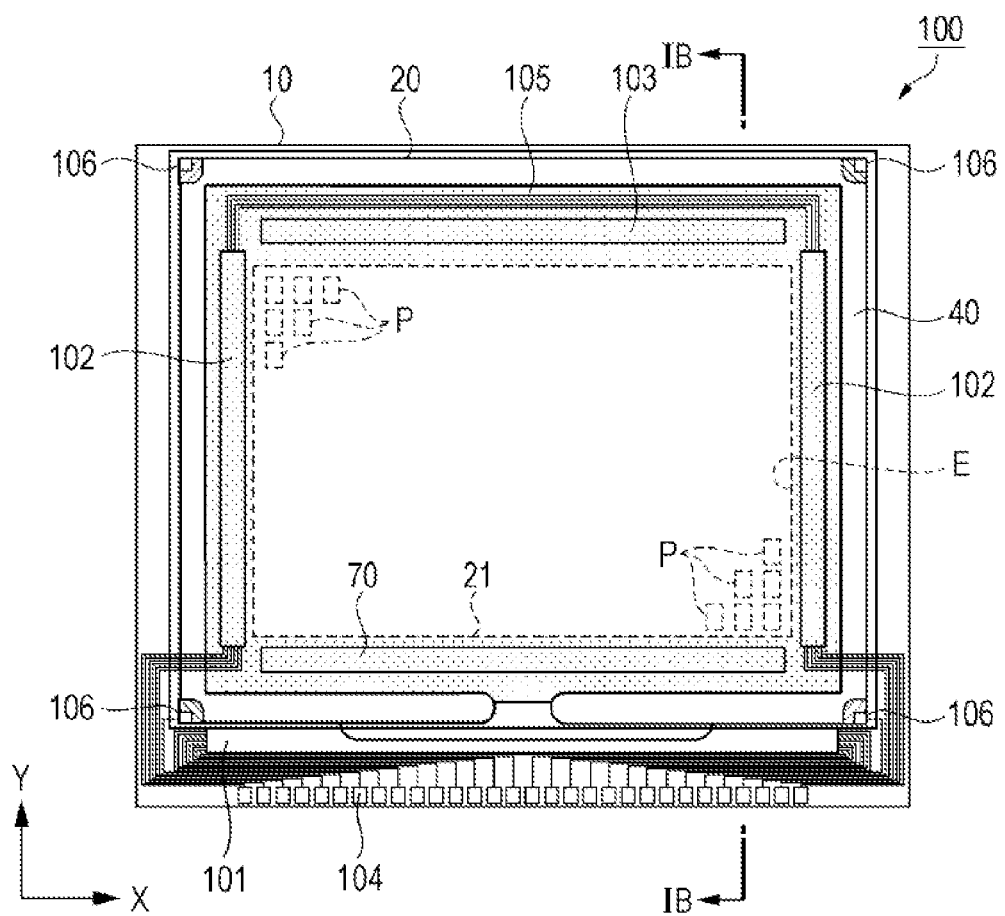
FIG. 1A is a schematic plan view illustrating a configuration of a liquid crystal device.
Figure 1B:
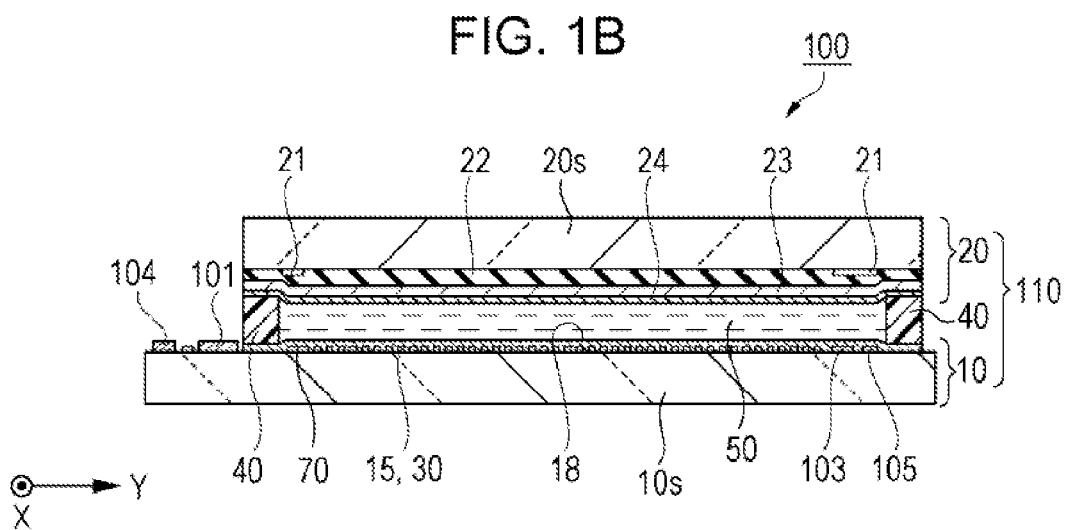
FIG. 1B is a schematic cross-sectional view illustrating a structure of the liquid crystal device taken along a line IB-IB in FIG. 1A.
Figure 2:
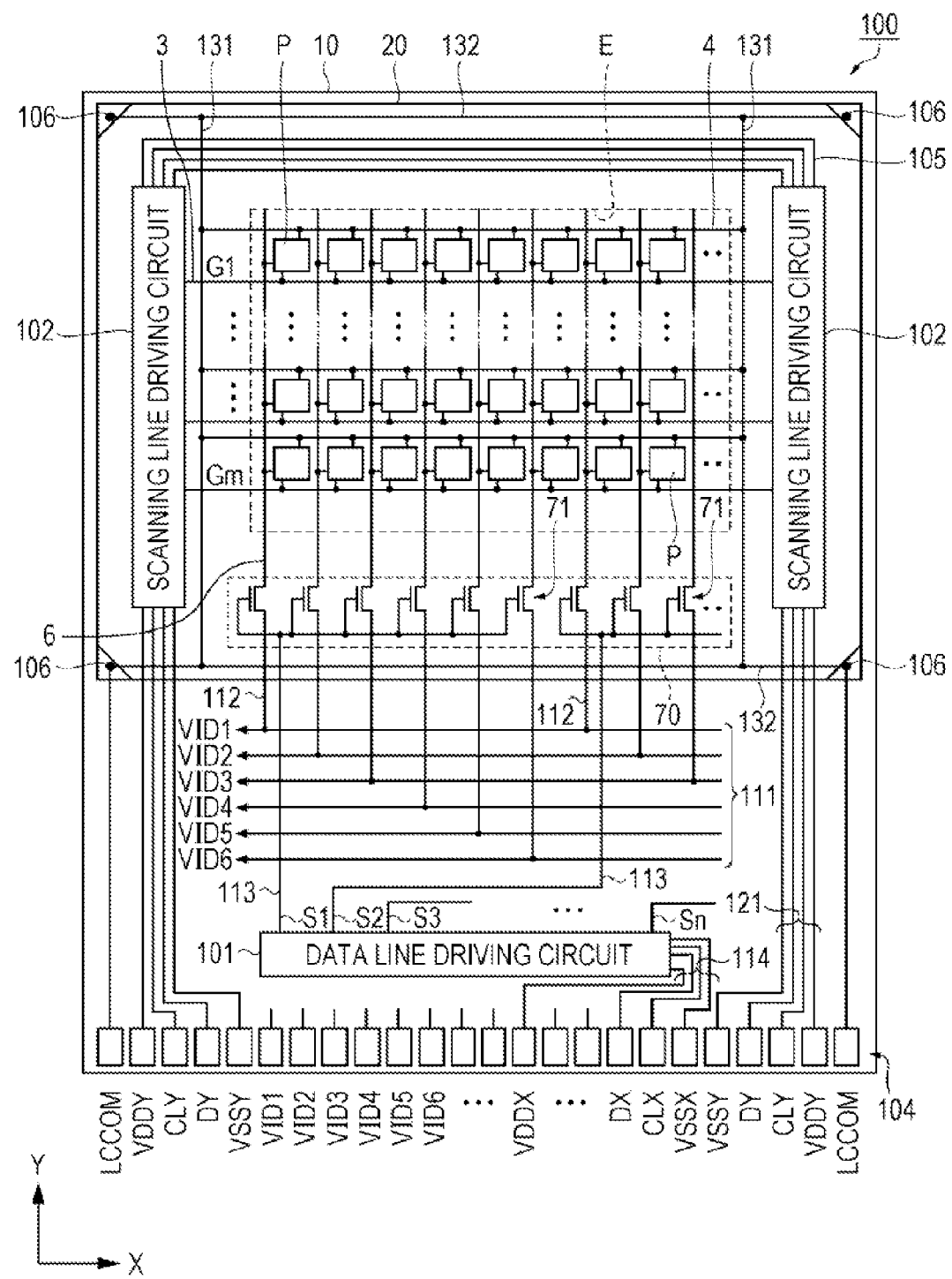
FIG. 2 is a circuit diagram illustrating an electrical configuration of the liquid crystal device.
Figure 3:
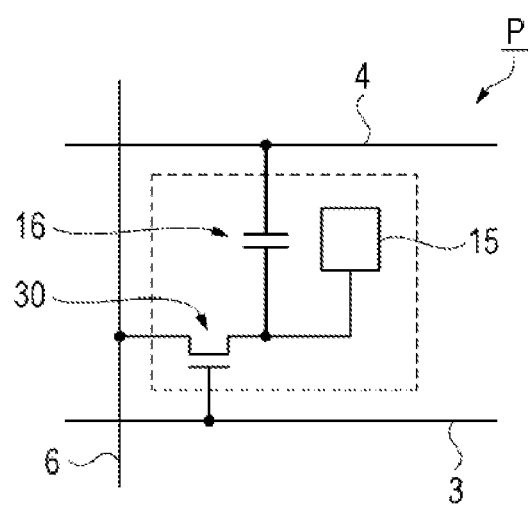
FIG. 3 is an equivalent circuit diagram illustrating an electrical configuration of a pixel circuit.

First, the overview of a liquid crystal device as an electro-optical device of this embodiment will be described with reference to FIG. 1A through FIG. 3. FIG. 1A is a schematic plan view illustrating a configuration of the liquid crystal device, FIG. 1B is a schematic cross-sectional view illustrating a structure of the liquid crystal device taken along a line IB-IB in FIG. 1A. FIG. 2 is a circuit diagram illustrating an electrical configuration of the liquid crystal device, and FIG. 3 is an equivalent circuit diagram illustrating an electrical configuration of a pixel circuit.

As shown in FIGS. 1A and 1B, a liquid crystal device 100 as an electro-optical device according to this embodiment includes an element substrate 10 and an opposing substrate 20 that are disposed facing each other, and a liquid crystal layer 50 sandwiched between a pair of the substrates. A transparent substrate such as a quartz substrate, a glass substrate, or the like is used for a substrate material 10s of the element substrate 10 and a substrate material 20s of the opposing substrate 20.

The element substrate 10 is larger than the opposing substrate 20 in size, and the two substrates are bonded to each other with a gap therebetween via a seal member 40 that is disposed along an outer circumference of the opposing substrate 20. Liquid crystal having a positive or negative dielectric anisotropy is injected into the above gap to form the liquid crystal layer 50. As the seal member 40, for example, an adhesive formed of a thermosetting or ultraviolet curing epoxy resin, or the like is employed. A spacer (not shown) is mixed in the seal member 40 so as to maintain the gap between the pair of substrates to be constant.

A pixel region E where a plurality of pixels P are arranged is provided inside the seal member 40. A parting section 21 is provided between the seal member 40 and the pixel region E while surrounding the pixel region E. The parting section 21 is made of, for example, a light blocking metal, metal oxide, or the like. Although not illustrated in FIG. 1A and FIG. 1B, the pixel region E includes, in addition to the plurality of pixels P that contribute to display operation, a plurality of dummy pixels that are disposed surrounding the plurality of pixels P. Further, a light blocking unit (black matrix; BM) configured to horizontally define each of the plurality of pixels P in the pixel region E is provided in the opposing substrate 20.

A plurality of external connection terminals 104 are provided on the element substrate 10. A data line driving circuit 101 is provided between the seal member 40 extending along a first side area where the plurality of external connection terminals 104 are arranged and the first side area. A sampling circuit 70 is provided at the inside of the area where the seal member 40 is provided between the data line driving circuit 101 and the pixel region E. A test circuit 103 is provided between the pixel region E and the seal member 40 extending along a second side area opposing the first side area. Further, scanning line driving circuits 102 are provided between the pixel region E and the seal member 40 extending along a third side area and a fourth side area that oppose each other and are orthogonal to the first side area. A plurality of interconnects 105 for connecting the two scanning line driving circuits 102 to each other are provided between the seal member 40 extending along the second side area and the test circuit 103.

Interconnects connecting with the data line driving circuit 101 and the scanning line driving circuits 102, are connected to the plurality of external connection terminals 104 arranged along the first side area. Hereinafter, a direction along the first side area is referred to as an X direction, while a direction along the third side area and the fourth side area opposing each other and orthogonal to the first side area is referred to as a Y direction. The X direction is a direction that corresponds to "first direction" of this invention, while the Y direction is a direction that corresponds to "second direction" of this invention.

The data line driving circuit 101, the scanning line driving circuits 102, the test circuit 103, and the sampling circuit 70 are peripheral circuits that control and drive the pixel circuit of the pixel P. Details of the pixel circuit and the peripheral circuits will be explained later.

As shown in FIG. 1B, on a surface of the element substrate 10 on the liquid crystal layer 50 side, there are formed light-transmissive pixel electrodes 15 provided for each of the pixels P, thin-film transistors (hereinafter, referred to as "TFTs") 30 serving as switching elements, signal wiring, and an alignment layer 18 covering these elements. Note that such a light blocking structure is employed that prevents the switching operations from becoming unstable due to light entering the semiconductor layers of the TFTs 30. The element substrate 10 as a substrate of this invention includes at least the substrate material 10s, as well as the pixel electrodes 15, the TFTs 30, the signal wiring, and the alignment layer 18 that are formed on the substrate material 10s.

On a surface of the opposing substrate 20 on the liquid crystal layer 50 side, there are provided the parting section 21, a flattening layer 22 deposited so as to cover the parting section 21, a common electrode 23 provided so as to cover the flattening layer 22, and an alignment layer 24 that covers the common electrode 23. The opposing substrate 20 is a substrate that includes at least the substrate material 20s, as well as the parting section 21, the common electrode 23, and the alignment layer 24 that are formed on the substrate material 20s.

The parting section 21, as shown in FIG. 1A, is provided at a location surrounding the pixel region E and overlapping with the scanning line driving circuits 102, the test circuit 103, and the sampling circuit 70 when viewed from above. With this, the parting section 21 blocks light that enters from the opposing substrate 20 side into these peripheral circuits so as to prevent operation failure of the peripheral circuits due to the light. The parting section 21 blocks unnecessary stray light from entering the pixel region E so as to ensure high-contract display in the pixel region E.

The flattening layer 22 is formed of, for example, an inorganic material such as silicon oxide, is light-transmissive, and is provided so as to cover the parting section 21. As a method for forming the flattening layer 22, a deposition method using plasma CVD method or the like can be cited.

The common electrode 23 is formed of, for example, a transparent conductive film such as indium tin oxide (ITO) or the like, covers the flattening layer 22, and is electrically connected with the wiring at the element substrate 10 side by conductive through-holes 106 provided in the four corners of the opposing substrate 20, as shown in FIG. 1A.

The alignment layer 18 that covers the pixel electrodes 15 and the alignment layer 24 that covers the common electrode 23 are selected based on optical design of the liquid crystal device 100. For example, the following alignment layers can be given: that is, an organic alignment layer in which an organic material such as polyimide or the like is deposited, and a substantially horizontal alignment process is performed on the liquid crystal molecules having a positive dielectric anisotropy by rubbing the surface of the deposited layer; and an inorganic alignment layer in which an inorganic material such as silicon oxide ($SiO_x$) or the like is deposited using a vapor phase growth method. The inorganic alignment layer vertically aligns the liquid crystal molecules which has a negative dielectric anisotropy.

The liquid crystal device 100 is a transmissive type, where there is employed the normally white mode optical design in which the transmittance of the pixel P is maximum when a voltage is not applied, the normally black mode optical deign in which the transmittance of the pixel P is minimum when the voltage is not applied, or the like. Polarization elements are disposed on both a light entering side and a light output side of a liquid crystal panel 110 including the element substrate 10 and the opposing substrate 20 in accordance with the optical design.

Next, an electrical configuration of the liquid crystal device 100 will be described with reference to FIG. 2 and FIG. 3. As shown in FIG. 2, the liquid crystal device 100 includes the peripheral circuits such as the data line driving circuit 101, the scanning line driving circuits 102, the sampling circuit 70, and so on that are formed in a peripheral region surrounding the pixel region E on the element substrate 10 (note that the test circuit 103 is not illustrated in FIG. 2), and the plurality of external connection terminals 104. Further, the device has a plurality of pieces of distribution wiring connected with the external connection wiring 104, including data line driving circuit wiring 114 for supplying the data line driving circuit 101 with electric power (VDDX, VSSX), signals for driving (DX, CLX, and so on) and the like, scanning line driving circuit wiring 121 for supplying the scanning line driving circuits 102 with electric power (VDDY, VSSY), signals for driving (DY, CLY, and so on) and the like, a plurality of image signal lines 111 for supplying data lines 6 with image signals (VID1 through VID6) via the sampling circuit 70, and the like.

The data line driving circuit 101 is supplied with an X clock signal CLX (and an inverted X clock signal CLX) and an X start pulse signal DX from an external circuit via the external connection terminals 104 and the data line driving circuit wiring 114. The data line driving circuit 101, upon receiving the X start pulse signal DX, generates selection signals S1, S2, S3, ..., Sn in series at a timing based on the X clock signal CLX (and the inverted X clock signal CLX) and outputs the respective generated signals to a plurality of selection signal supply lines 113.

The scanning line driving circuits 102 are supplied with a Y clock signal CLY (and an inverted Y clock signal CLY) and a Y start pulse signal DY from an external circuit via the external connection terminals 104 and the scanning line driving circuit wiring 121. The scanning line driving circuits 102 generate scanning signals G1, ..., Gm in series based on these signals and output the respective generated signals to a plurality of scanning lines 3.

The sampling circuit 70 includes a plurality of sampling transistors (hereinafter, referred to as "S-TFTs") 71 each configured of an N-type one-sided channel TFT or a complementary TFT. The gates of six S-TFTs 71 to which respective six data lines 6 adjacent to each other are connected, are put together and connected to a single selection signal supply line 113. In other words, the respective selection signals S1, S2, S3, ..., Sn are supplied to the six S-TFTs 71 as one unit (group) from the data line driving circuit 101. Any one of the image signal lines 111 is connected to each of the sources of the six S-TFTs 71 configuring one unit (group) via interconnects 112. The data lines 6 are connected to the drains of the S-TFTs 71. The sampling circuit 70, upon receiving the selection signals S1, S2, ..., Sn, supplies the image signals (VID1 through VID6) in series to the data lines 6 corresponding to the six S-TFTs 71 configuring one unit (group) in accordance with the selection signals S1, S2, S3, ..., Sn.

As shown in FIG. 2, the liquid crystal device 100 includes the plurality of pixels P arranged in a matrix in the pixel region E, which is present in a central area of the element substrate 10, as described before.

As shown in FIG. 3, the pixel electrode 15, the TFT 30 for switching-control of the pixel electrode 15, and a holding capacitor 16 are formed in each of the plurality of pixels P. The data line 6 supplied with the image signals (VID1 through VID6) is electrically connected with the source of the TFT 30. A scanning line 3 supplied with the scanning signals G1, ..., Gm is electrically connected with the gate of the TFT 30. The pixel electrode 15 and one electrode of the holding capacitor 16 are connected with the drain of the TFT 30. The other electrode of the holding capacitor 16 is connected with a capacitor line 4 disposed in parallel to the scanning line 3.

As shown in FIG. 2, the capacitor line 4 is extended to the outside of the pixel region E in the X direction, and both ends of the capacitor line 4 are electrically connected with a pair of interconnects 131 extending in the Y direction between the scanning line driving circuits 102 and the pixel region E. The pair of interconnects 131 is connected with a pair of interconnects 132 each of which electrically connects two conductive through-holes 106 with each other among the four conductive through-holes 106 that are provided in the corners of the opposing substrate 20; the two conductive through-holes 106 mentioned above are through-holes that face each other in the X direction.

The pair of interconnects 132 is electrically connected with each other via the common electrode 23 of the opposing substrate 20 that is electrically connected with the conductive through-holes 106. Further, of the pair of interconnects 132, the interconnect 132 located on the external connection terminals 104 side is connected with the external connection terminal 104 to which a common potential (LCCOM) is supplied. In other words, the common potential (LCCOM) is applied to the capacitor line 4. The common potential (LCCOM) is also called a fixed potential because a constant potential is maintained compared to the pixel electrode 15 whose potential varies due to the image signals (VID1 through VID6) supplied thereto.

The selection signals S1, S2, S3, ..., Sn supplied to the S-TFTs 71 of the sampling circuit 70, every six of which are processed as one unit (group), may be supplied in series in that order, or may be supplied to the S-TFTs 71 corresponding to every six data lines 6 adjacent to each other in groups. Note that, as shown in FIG. 2, the configuration of this embodiment is such that the selection signals S1, S2, S3, ..., Sn are supplied, in a group-by-group manner, to each set of the six data lines 6 corresponding to the image signals (VID1 through VID6) having been developed to six phases through serial-parallel development. The number of developed phases of the image signals (VID1 through VID6), that is, the number of groups into which the image signals are developed through the serial-parallel development, is not limited to six; for example, such a configuration may be employed that the image signals developed to a plurality of phases, such as 9 phases, 12 phases, 24 phases, or the like are supplied to each set of the data lines 6 that are grouped according to the number of the developed phases.

The scanning lines 3 are configured so that the scanning signals G1, ..., Gm are sequentially applied in pulses to the scanning lines 3 in that order from the scanning line driving circuits 102 at a predetermined timing. As described before, each of the pixel electrodes 15 is electrically connected with the drain of the TFT 30; the TFT 30 is made to be ON for a set period of time by the scanning signals G1, ..., Gm so that the respective image signals (VID1 through VID6) supplied from the data lines 6 are written into the pixel electrode 15 during that period of time.

Further, the holding capacitor 16 is added in parallel to liquid crystal capacitance formed between the pixel electrode 15 and the common electrode 23 so as to prevent the image signals (VID1 through VID6) held in the respective pixels P from being leaked.

The image signals (VID1 through VID6) having been written in the liquid crystal layer 50 (see FIG. 1B) at a predetermined level via the pixel electrodes 15, are held for a set period of time between the liquid crystal layer 50 and the common electrode 23 which is formed in the opposing substrates 20. Alignment or order of the liquid crystal molecules in the liquid crystal layer 50 is changed depending on an applied voltage level so that light that passes the liquid crystal layer 50 is modulated accordingly, thereby making it possible to provide gradation display. In the case of the normally white mode, transmittance with respect to incident light decreases in accordance with a voltage applied to each of the pixels P so as to provide dark display; while in the case of the normally black mode, transmittance with respect to the incident light increases in accordance with the voltage applied to each of the pixels P so as to provide light display. In this manner, display light with contrast in accordance with the image signals (VID1 through VID6) is outputted from the liquid crystal device 100 as a whole to perform display operation. In order to drive the liquid crystal layer 50 in an AC drive mode, the image signals (VID1 through VID6) are so configured as to combine potential pulses having a positive polarity and potential pulses having a negative polarity with respect to the common potential (LCCOM). The driving system of the liquid crystal device 100 discussed above is called a phase development driving system. It is to be noted that the driving system of the liquid crystal device 100 is not limited to the phase development driving system.

The peripheral circuits may include, aside from the data line driving circuit 101, the scanning line driving circuits 102, the test circuit 103, and the sampling circuit 70, a pre-charge circuit configured to supply the data lines 6 with a pre-charge signal at a predetermined voltage level prior to the image signals (VID1 through VID6).

Figure 4A:
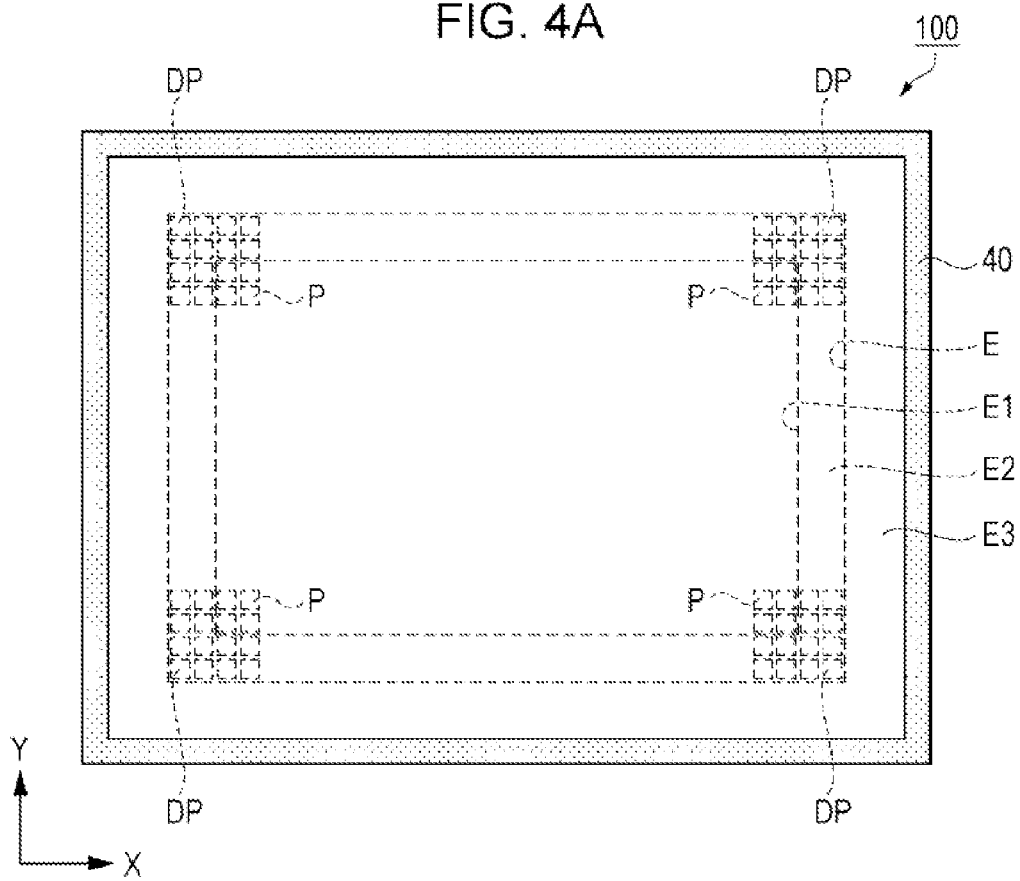
FIG. 4A is a schematic plan view illustrating arrangement of pixels and dummy pixels.
Figure 4B:
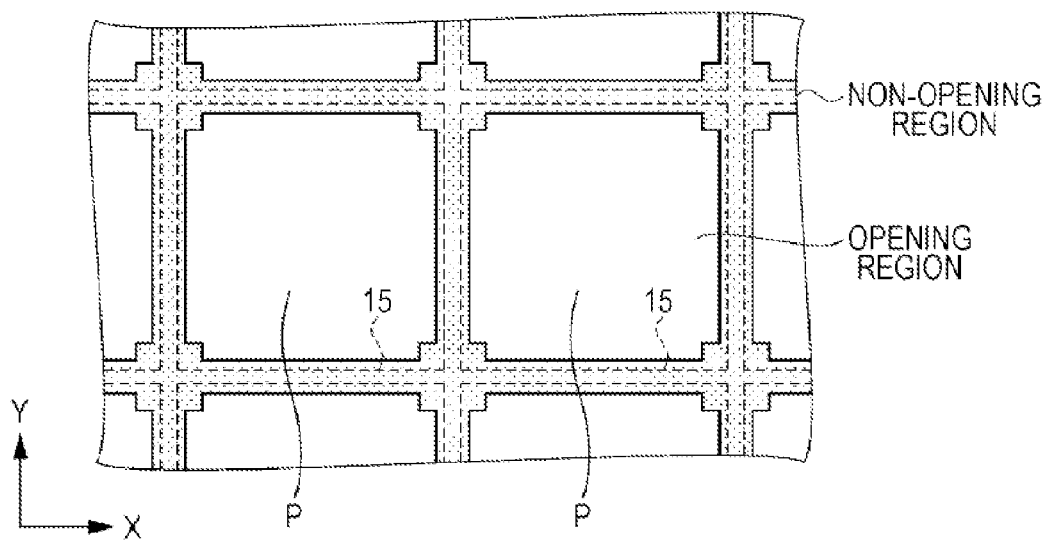
FIG. 4B is an enlarged plan view illustrating arrangement of pixels.
Figure 5:
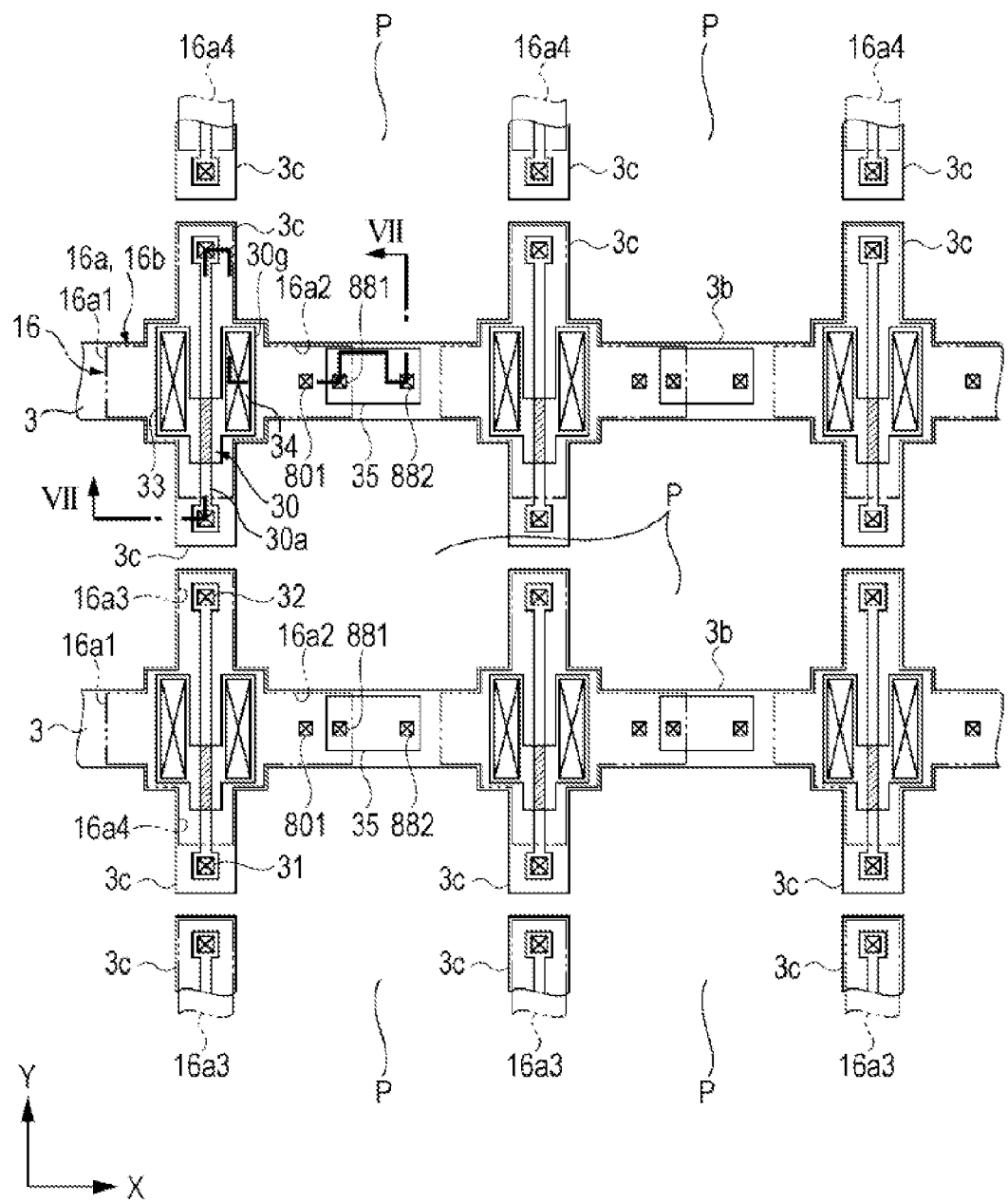
FIG. 5 is a schematic plan view illustrating arrangement of circuit configurations of pixels.
Figure 6:
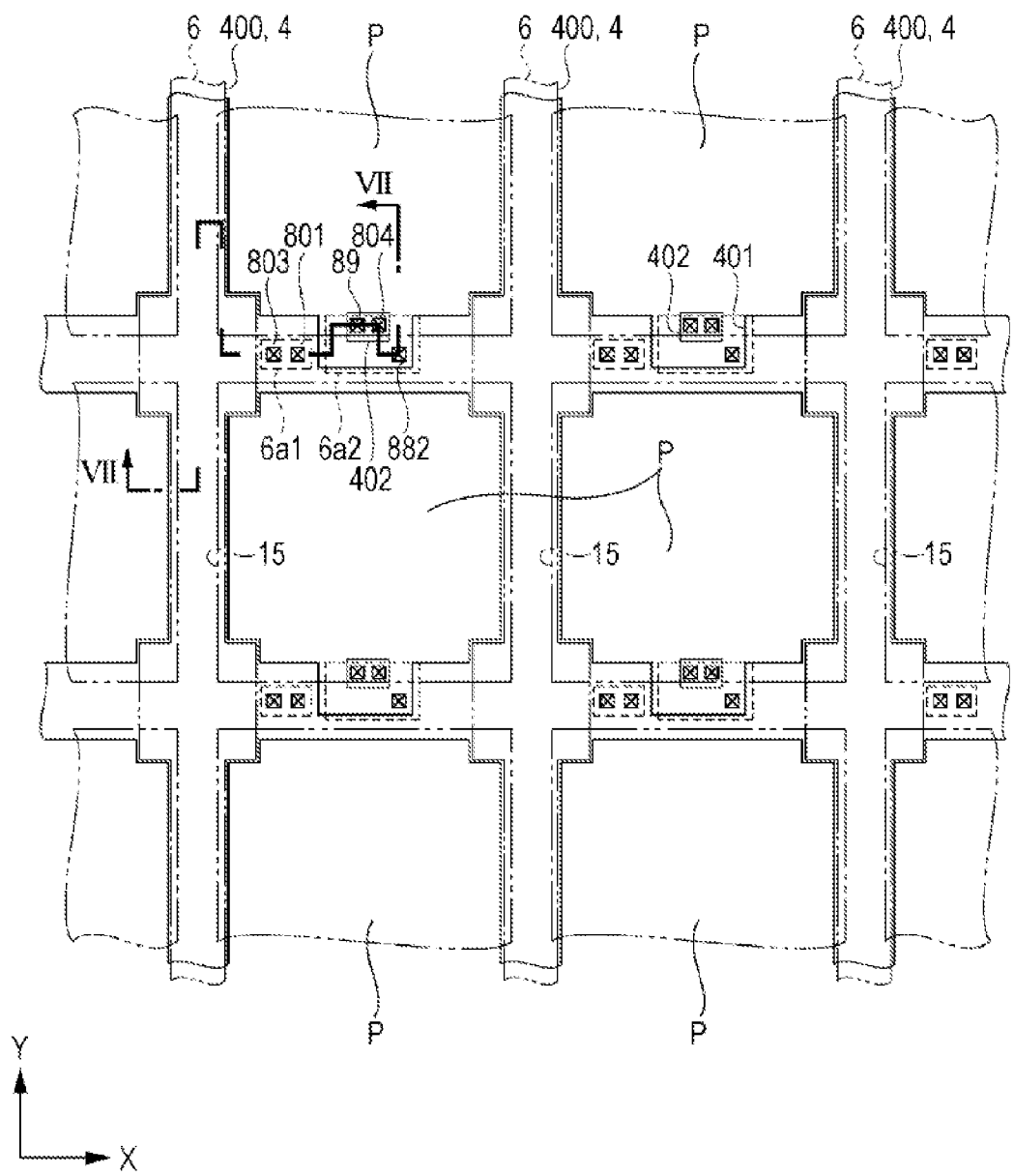
FIG. 6 is another schematic plan view illustrating arrangement of circuit configurations of pixels.
Figure 7:
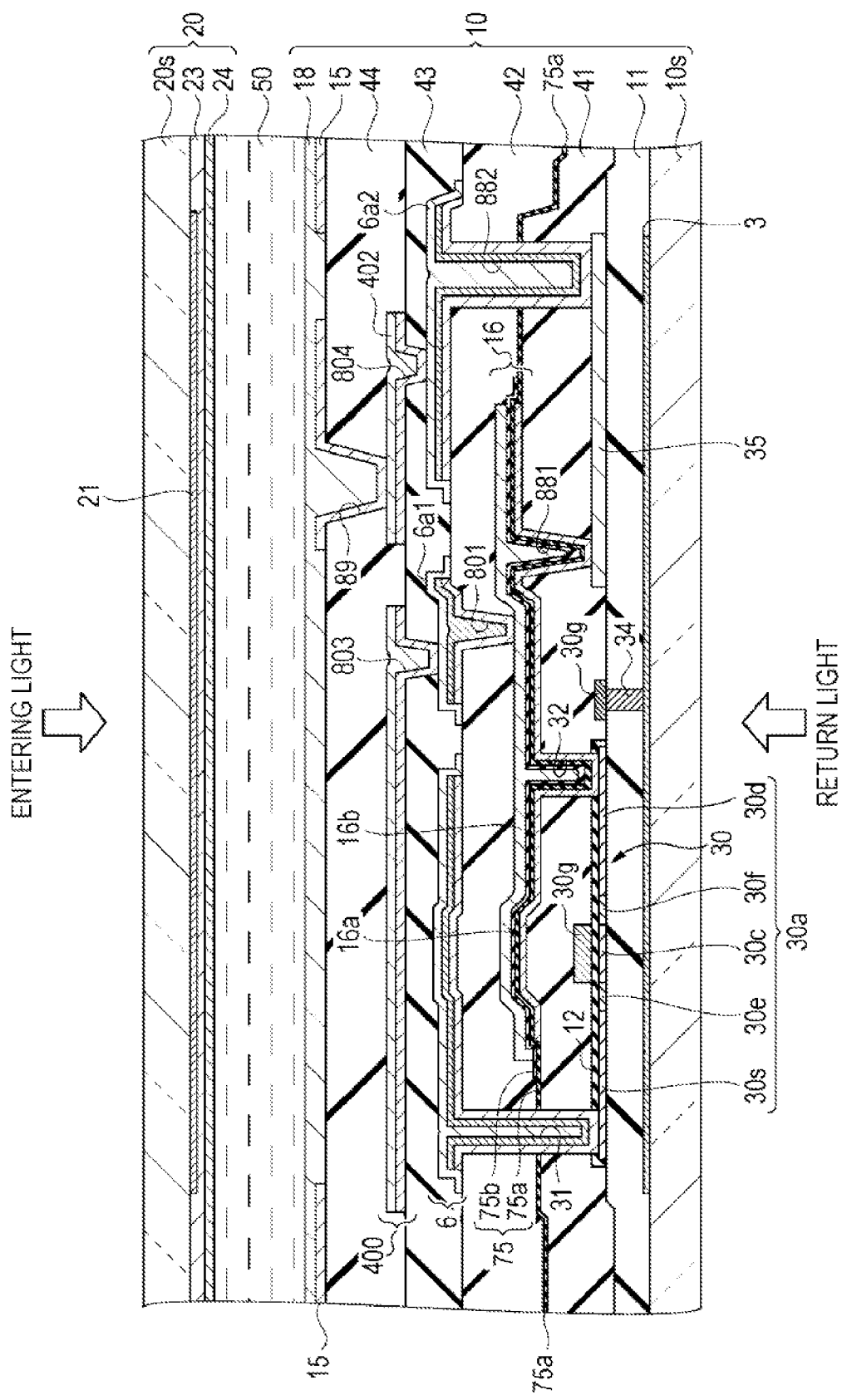
FIG. 7 is a schematic cross-sectional view illustrating a structure of a pixel taken along a line VII-VII in FIG. 5 and FIG. 6.

Next, the pixel P of the liquid crystal device 100 will be described with reference to FIG. 4A through FIG. 7. FIG. 4A is a schematic plan view illustrating arrangement of pixels and dummy pixels; FIG. 4B is an enlarged plan view illustrating arrangement of pixels. FIG. 5 and FIG. 6 are schematic plan views illustrating arrangement of circuit configurations of pixels. FIG. 7 is a schematic cross-sectional view illustrating a structure of a pixel taken along a line VII-VII in FIG. 5 and FIG. 6.

As shown in FIG. 4A, the pixel region E of the liquid crystal device 100 of this embodiment includes a display region E1 where the pixels P that contribute to display operation are arranged and a dummy pixel region E2 including a plurality of dummy pixels DP that are arranged surrounding the display region E1. Between the region where the seal member 40 is disposed in a frame form and the dummy pixel region E2, there are provided the peripheral circuits (including the data line driving circuit 101, scanning line driving circuits 102, test circuit 103, and sampling circuit 70). The region where the peripheral circuits are provided is a peripheral circuit region E3.

In this embodiment, the dummy pixels DP are arranged in sets of two dummy pixels in the dummy pixel region E2 while sandwiching the display region E1 in the X direction; likewise, the dummy pixels DP are arranged in sets of two dummy pixels in the dummy pixel region E2 while sandwiching the display region E1 in the Y direction. The number of the dummy pixels DP arranged in the dummy pixel region E2 as a set is not limited to two; it is sufficient that the dummy pixels DP are arranged in sets of at least two dummy pixels while sandwiching the display region E1 in each of the X direction and the Y direction. The number of the dummy pixels DP arranged as a set may be three or more; the number of the dummy pixels DP arranged in the X direction may differ from that in the Y direction.

As shown in FIG. 4B, the pixel P that contributes to display operation has an opening region where modulated display light is taken out. The opening region is substantially square in shape when viewed from above, and enclosed by a light blocking non-opening region extending in the X direction and the Y direction. The pixel electrode 15 of the pixel P is arranged in the opening region and is also arranged so that an outer edge of the pixel electrode 15 overlaps with the non-opening region.

In the non-opening region extending in the X direction, the scanning line 3, the capacitor line 4, and the like are disposed. In the non-opening region extending in the Y direction, the data line 6 is disposed. The TFT 30, the holding capacitor 16, and the like are disposed in an intersection portion of the non-opening region. The intersection portion of the non-opening region is larger in width than the portion thereof extending in the X direction and Y direction because the TFT 30, the holding capacitor 16, and the like are disposed therein. Accordingly, the intersection portion has a square shape whose four corners each stick out toward the opening region side when viewed from above.

Hereinafter, specific arrangement of circuit configurations of the pixels P will be described with reference to FIGS. 5 and 6. It is to be noted that in FIG. 5, the arrangement of the scanning lines 3, the TFTs 30, and the holding capacitors 16 is illustrated, while in FIG. 6, the arrangement of the data lines 6, the capacitor lines 4, and the pixel electrodes 15 that are provided in an upper layer than the layer of the holding capacitors 16.

As shown in FIG. 5, the scanning line 3 includes a main line portion 3b extending across the plurality of pixels P in the X direction and a projecting portion 3c that projects in the Y direction at a position corresponding to the intersection portion of the non-opening region. The projecting portion 3c projects upward and downward in the Y direction from the main line portion 3b, and length of the projecting portion 3c in the Y direction is approximately the same as length of the opening region of the pixel P in the Y direction.

A semiconductor layer 30a of the TFT 30 is disposed extending in the Y direction so as to overlap with the projecting portion 3c. A contact that functions as a source electrode 31 and establishes electrical connection with the data line 6 to be explained later, is provided at one end of the semiconductor layer 30a (lower side in the Y direction in FIG. 5). Another contact that functions as a drain electrode 32 and establishes electrical connection with the data line 6 and the holding capacitor 16 to be explained later, is provided at the other end of the semiconductor layer 30a (upper side in the Y direction in FIG. 5). Accordingly, the source electrode 31 is called a contact 31 in some cases, and the drain electrode 32 is called a contact 32 in some cases.

A gate electrode 30g is disposed in the intersection portion. The gate electrode 30g includes a portion extending in the X direction and a portion that is bent in the Y direction from the portion extending in the X direction. Of the gate electrode 30g, the portion extending in the X direction is disposed overlapping with a channel region of the semiconductor layer 30a (a portion of the semiconductor layer 30a being hatched in FIG. 5). Of the gate electrode 30g, the portion bent along the Y direction (a portion extending in the Y direction) is provided on both sides of the semiconductor layer 30a. Further, a pair of gate contacts 33, 34 is provided in the portion of the gate electrode 30g that is bent along the Y direction, so as to establish electrical connection with the scanning line 3.

In addition, a pair of electrodes of the holding capacitor 16 is disposed in the intersection portion. Of the pair of electrodes, the one that is located in a lower layer on the element substrate 10 (substrate material 10s) is referred to as a lower capacitor electrode 16a. The one located in an upper layer compared with the lower capacitor electrode 16a is referred to as an upper capacitor electrode 16b. Since the lower capacitor electrode 16a and the upper capacitor electrode 16b are disposed facing each other, the lower capacitor electrode 16a will be described here as a representative of the two electrodes. The lower capacitor electrode 16a is disposed so as to overlap with the scanning line 3. More specifically, the lower capacitor electrode 16a includes projecting portions 16a1 and 16a2 projecting in the X direction along the main line portion 3b of the scanning line 3, and projecting portions 16a3 and 16a4 projecting in the Y direction along the projecting portion 3c of the scanning line 3. Length of the projecting portion 16a1 in the X direction is shorter than length of the projecting portion 16a2, while length of the projecting portion 16a3 in the Y direction is longer than length of the projecting portion 16a4. The upper capacitor electrode 16b also includes projecting portions projecting in the X direction and the Y direction. In other words, the pair of electrodes of the holding capacitor 16 is shaped substantially in a cross when viewed from above.

The projecting portion 16a3 of the lower capacitor electrode 16a is projected in the Y direction to a position overlapping with the drain electrode 32 of the TFT 30 and is connected with the drain electrode 32.

Between the TFTs 30 of the pixels P adjacent to each other in the X direction, there are provided a contact 801 for establishing electrical connection between the upper capacitor electrode 16b and the capacitor line 4, a relay electrode 35 for establishing electrical connection between the lower capacitor electrode 16a and the pixel electrode 15 to be explained later, and contacts 881, 882 in contact with the relay electrode 35.

As shown in FIG. 6, the data line 6 is disposed across the plurality of pixels P in the Y direction. A portion of the data line 6 that corresponds to the intersection portion of the non-opening region is also larger in width in the X direction and Y direction than the other portion of the data line 6. Further, capacitor wiring 400 is provided in a lattice form so as to overlap with the scanning line 3 in the X direction (see FIG. 5) and overlap with the data line 6 in the Y direction, when viewed from above. The capacitor wiring 400 is wiring that functions as the capacitor line 4 discussed before.

Between the intersection portions of the capacitor wiring 400 adjacent to each other in the X direction, two relay electrodes 6a1 and 6a2 are provided each being formed in an island shape in the same layer as the data line 6. Further, two contacts 801 and 803 are provided at positions overlapping with the relay electrode 6a1. A contact 882 is provided at a position overlapping with the relay electrode 6a2.

Moreover, between the above intersection portions, part of the capacitor wiring 400 extending in the X direction is cut out to form a cutout 401 in which a relay electrode 402 is formed in an island shape in the same layer as the capacitor wiring 400. Two contacts 89, 804 are provided at positions overlapping with the relay electrode 402. The contact 89 is a contact to establish electrical connection between the relay electrode 402 and the pixel electrode 15, while the contact 804 is a contact to establish electrical connection between the relay electrode 6a2 and the relay electrode 402.

Next, the structure of the pixel P will be described with reference to FIG. 7.

As shown in FIG. 7, on the substrate material 10s of the element substrate 10, there are formed a first layer including the scanning line 3, a second layer including the TFT 30 and the like, a third layer including the holding capacitor 16, a fourth layer including the data line 6 and the like, a fifth layer including the capacitor wiring 400 and the like, and a sixth layer (uppermost layer) including the pixel electrode 15, the alignment layer 18, and the like. Further, a base insulation film 11 is formed between the first and second layers, a first interlayer insulation film 41 is formed between the second and third layers, a second interlayer insulation film 42 is formed between the third and fourth layers, a third interlayer insulation film 43 is formed between the fourth and fifth layers, and a fourth interlayer insulation film 44 is formed between the fifth and sixth layers, so as to prevent the above constituent elements from being short-circuited. Further, in the base insulation film 11 and the first interlayer insulation film 41 through fourth interlayer insulation film 44, there are also formed, for example, the contact 31 for electrically connecting a first source-drain region 30s of the semiconductor layer 30a of the TFT 30 with the data line 6, and the like. Description of these elements will be given below step by step. Of the above-described layers, the first through third layers are illustrated as a lower layer portion in FIG. 5, meanwhile the fourth through sixth layers are illustrated as an upper layer portion in FIG. 6.

First, in the first layer, there is formed the scanning line 3 that is configured with a single metal, an alloy, metal silicide, poly-silicide, a material in which these elements are laminated, conductive poly-silicon, or the like. Note that the above-mentioned materials include at least one of high melting-point metals such as Ti, Cr, W, Ta, Mo, and so on. In particular, in order for the scanning line 3 to block return light that comes from the substrate material 10s side and not to reflect entering light that comes from the opposing substrate 20 side, it is preferable for the scanning line 3 to be formed using metal silicide. Therefore, in this embodiment, the scanning line 3 is formed using tungsten silicide (WSi). A film thickness of the scanning line 3 is approximately 200 nm.

Metal silicide has such a property that blocks entering light and is unlikely to reflect entering light; meanwhile, metal silicide also has such a property that a film stress produced therein is large when, for example, being heated. Accordingly, in the case where a stress is partially concentrated within a specific area, a crack is likely to be generated to damage the metal silicide. In this embodiment, patterning design of the scanning line 3 is carried out while considering such properties of metal silicide. Details of the scanning line 3 will be explained later.

Next, the base insulation film 11 that covers the scanning line 3 is formed. The base insulation film 11 is formed using silicon oxide, for example. The base insulation film 11 is approximately 450 nm thick.

Subsequently, in the second layer, the semiconductor layer 30a is formed on the base insulation film 11. The semiconductor layer 30a is formed of, for example, poly-silicon, and impurity ions are selectively injected therein so as to construct a lightly doped drain (LDD) structure including the first source-drain region 30s, a joint region 30e, a channel region 30c, a joint region 30f, and a second source-drain region 30d. A film thickness of the semiconductor layer 30a is approximately 40 nm.

Then, a gate insulation film 12 for covering the semiconductor layer 30a is formed. The gate insulation film 12 is formed using silicon oxide, for example. The gate insulation film 12 is approximately 55 nm thick.

Next, a contact hole shaped in a groove is formed in the base insulation film 11. Patterning is performed in which a conductive film is deposited to fill the contact hole so as to form the gate electrode 30g and the pair of gate contacts 33, 34. In FIG. 7, of the pair of gate contacts 33 and 34, the gate contact 34 is illustrated whereas the gate contact 33 is not illustrated. With this, part of the semiconductor layer 30a of the TFT 30 is, as shown in FIG. 5, covered with the pair of gate contacts 33 and 34 in a lateral direction when viewed from above, and at least the light that enters from the side of the pair of gate contacts 33, 34 is blocked. Lower ends of the gate contacts 33 and 34 are so formed as to make contact with the scanning line 3. Therefore, the gate electrode 30g and the scanning line 3 present together in a certain row (X direction) always have the same potential as far as the above certain row is concerned.

The relay electrode 35 is formed on the base insulation film 11 using the same conductive film as the gate electrode 30g. As shown in FIG. 5, the relay electrode 35 is formed in an island shape so as to be positioned substantially at the center of one side area, extending in the X direction, of each pixel electrode 15 when viewed from above. The relay electrode 35 and the gate electrode 30g are formed using the same conductive film. As the conductive film used for the gate electrode 30g, a conductive poly-silicon film can be cited, for example. A film thickness of the gate electrode 30g and the relay electrode 35 are approximately 100 nm.

Then, the first interlayer insulation film 41 that covers the gate electrode 30g, the relay electrode 35, and the gate contact 34 is formed. The first interlayer insulation film 41 is formed using silicon oxide, for example, and the thickness thereof is approximately 300 nm.

The holding capacitor 16 is formed on the first interlayer insulation film 41 in the third layer. The holding capacitor 16 is formed including the lower capacitor electrode 16a, the upper capacitor electrode 16b, and a dielectric film 75 sandwiched between these capacitor electrodes. As can be understood from the plan view in FIG. 5, because the holding capacitor 16 is formed in the non-opening region, a pixel aperture ratio of the liquid crystal device 100 is maintained to be relatively large, thereby making it possible to display brighter images.

In the first interlayer insulation film 41, there are formed a contact hole extended to reach the second source-drain region 30d of the semiconductor layer 30a and another contact hole extended to reach the relay electrode 35; patterning is performed in which a conductive poly-silicon film, for example, is deposited to cover these contact holes so as to form the lower capacitor electrode 16a. A film thickness of the lower capacitor electrode 16a is approximately 100 nm. Through this, formed are the contact 32 (drain electrode 32) for electrically connecting the lower capacitor electrode 16a with the second source-drain region 30d and a contact 881 for electrically connecting the lower capacitor electrode 16a with the relay electrode 35.

Next, the dielectric film 75 that covers the lower capacitor electrode 16a is formed. The dielectric film 75 has a two-layer structure including a silicon oxide film 75a in a lower layer and a silicon nitride film 75b in an upper layer. The silicon oxide film 75a is formed so as to cover the lower capacitor electrode 16a and the first interlayer insulation film 41. The silicon nitride film 75b is patterned so as to cover a region where the lower capacitor electrode 16a is formed. The silicon oxide film 75a is approximately 5 nm thick, and the silicon nitride film 75b is approximately 15 nm thick. The structure of the dielectric film 75 is not limited to the above two-layer structure. For example, the dielectric film 75 may be configured to have a three-layer structure of a silicon oxide film, a silicon nitride film, and a silicon oxide film, or may be configured to have a structure including more than three layers. Needless to say, a single layer structure may be employed.

Subsequently, patterning is performed in which a conductive poly-silicon film to cover the dielectric film 75 is deposited, for example, so as to form the upper capacitor electrode 16b opposing the lower capacitor electrode 16a with the dielectric film 75 therebetween. A film thickness of the upper capacitor electrode 16b is approximately 100 nm. Then, the second interlayer insulation film 42 that covers the upper capacitor electrode 16b is formed. The second interlayer insulation film 42 is formed using silicon oxide, for example, and the thickness thereof is approximately 400 nm.

In the second interlayer insulation film 42, a contact hole extended to reach the upper capacitor electrode 16b is formed. Further, there are formed a contact hole that passes through the first interlayer insulation film 41 and the second interlayer insulation film 42 so as to reach the first source-drain region 30s of the semiconductor layer 30a and another contact hole extended to reach the relay electrode 35. Patterning is performed in which a conductive film is deposited to cover these contact holes so as to form the data line 6, the relay electrode 6a1, and the relay electrode 6a2. With this, the data line 6 is electrically connected with the first source-drain region 30s of the semiconductor layer 30a, the rely electrode 6a1 is electrically connected with the upper capacitor electrode 16b, and the relay electrode 6a2 is electrically connected with the lower capacitor electrode 16a via the relay electrode 35 and the contact 881.

The data line 6 in the fourth layer is formed as a film having a three-layer structure in which laminated are a titanium nitride layer, an aluminum layer, and a titanium nitride layer in series from the bottom. The titanium nitride layer on the top is patterned slightly larger in size in order to cover the aluminum layer and the titanium nitride layer under the top titanium nitride layer.

The relay electrode 6a1 and the relay electrode 6a2 are formed in the same layer as the data line 6, and therefore have a three-layer structure in which laminated are a titanium nitride layer, an aluminum layer, and a titanium nitride layer in series from the bottom. A film thickness of the titanium nitride layer on the bottom is approximately 50 nm, a film thickness of the aluminum layer is approximately 350 nm, and a film thickness of the titanium nitride layer on the top is approximately 150 nm. Then, the third interlayer insulation film 43 that covers the data line 6 and the relay electrodes 6a1, 6a2 is formed. The third interlayer insulation film 43 is formed using, for example, silicon oxide. The third interlayer insulation film 43 is approximately 600 nm thick. Because unevenness is produced in the post-deposition surface of the third interlayer insulation film 43 due to the wiring structure in a lower layer, a flattening process such as chemical mechanical polishing (CMP), for example, is performed on that surface.

In the third interlayer insulation film 43, a contact hole extended to reach the relay electrode 6a1 and the relay electrode 6a2 is formed. Then, patterning is performed in which a conductive film is deposited to cover the above contact hole so as to form the capacitor wiring 400 electrically connected with the relay electrode 6a1 via the contact 803, and the relay electrode 402 electrically connected with the relay electrode 6a2 via the contact 804.

The capacitor wiring 400 in the fifth layer has a two-layer structure including a lower layer of aluminum and an upper layer of titanium nitride. A film thickness of the aluminum layer is approximately 350 nm, and a film thickness of the titanium nitride layer is approximately 150 nm. Likewise, the relay electrode 402 also has a two-layer structure. Then, the fourth interlayer insulation film 44 that covers the capacitor wiring 400 and the relay electrode 402 is formed. The fourth interlayer insulation film 44 can adopt a film of silicate glass such as NSG, PSG, BSG, BPSG or the like, a silicon nitride film, a silicon oxide film, or a laminate structure of these insulation films. In this embodiment, the fourth interlayer insulation film 44 has a two-layer structure including a lower layer of an NSG film and an upper layer of a BSG layer. The NSG film is approximately 600 nm thick, and the BSG film is approximately 170 nm thick.

A contact hole extended to reach the relay electrode 402 is formed in the fourth interlayer insulation film 44. Patterning is performed in which a transparent conductive film is deposited to cover the contact hole so as to form the pixel electrode 15 electrically connected with the relay electrode 402 via the contact 89.

The pixel electrode 15 in the sixth layer is formed using an ITO film, for example, and the thickness thereof is approximately 150 nm. With this, the pixel electrode 15 is electrically connected with the second source-drain region 30d of the semiconductor layer 30a via the contact 89, the relay electrode 402, the contact 804, the relay electrode 6a2, the relay electrode 35, the contact 881, the lower capacitor electrode 16a, and the contact 32.

The alignment layer 18 that covers the pixel electrode 15 is formed. With this, the element substrate 10 is completed.

Then, the opposing substrate 20 is disposed opposing the element substrate 10 with a predetermine gap therebetween and bonded to the element substrate 10. Liquid crystal is injected into the above gap to construct the liquid crystal layer 50. The parting section 21, the common electrode 23, and the alignment layer 24 are formed in series on a side of the opposing substrate 20 (substrate material 20s) that faces the liquid crystal layer 50. An organic alignment layer or an inorganic alignment layer is used for the alignment layers 18, 24 based on the optical design of the liquid crystal device 100.

The liquid crystal device 100 of this embodiment is a device that is used as a light modulation unit (light valve) of a projection display apparatus (liquid crystal projector) to be explained later in detail, and illumination light enters from the opposing substrate 20 side. Entering light is modulated for each pixel P based on image signals, and outputted as display light from the element substrate 10 side. The outputted display light reflects off the constituent members of the projection display apparatus to become return light and enters from the element substrate 10 side in some cases. Such return light is blocked by the scanning line 3.

Figure 8:
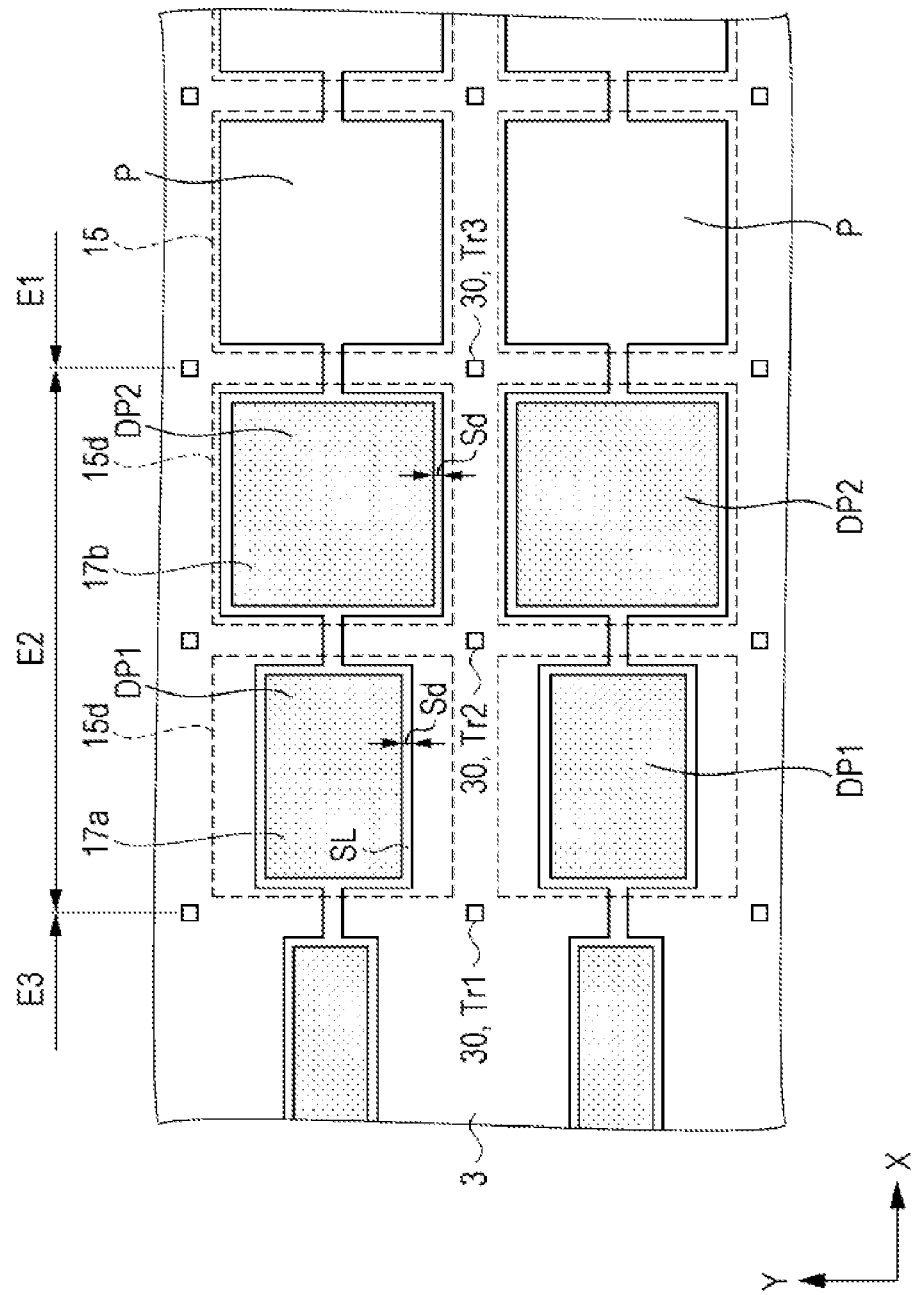
FIG. 8 is a schematic plan view illustrating a configuration of dummy pixels.
Figure 9:
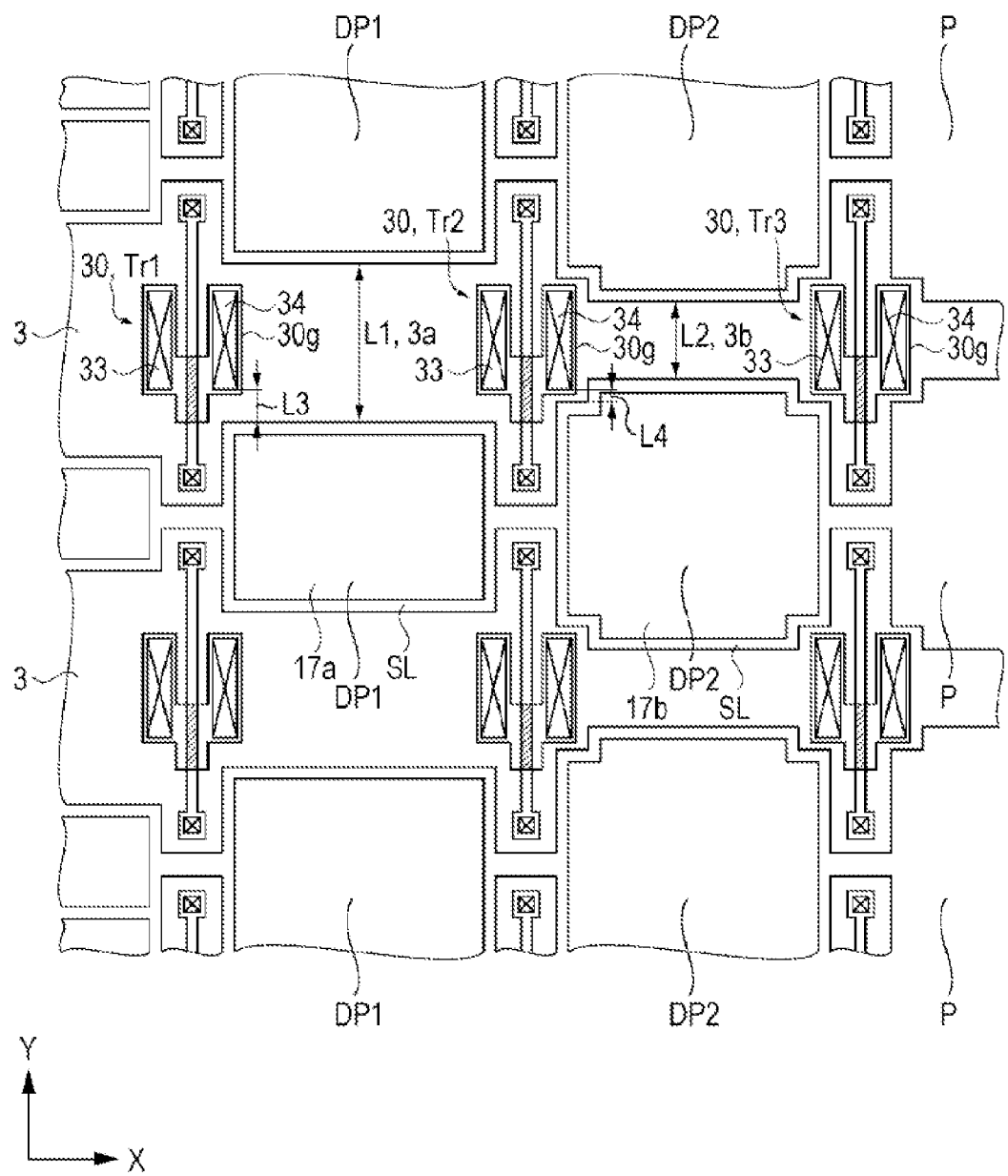
FIG. 9 is an enlarged plan view illustrating a configuration of dummy pixels.

Next, a configuration of the dummy pixels DP of this embodiment will be described with reference to FIG. 8 and FIG. 9. FIG. 8 is a schematic plan view illustrating the configuration of the dummy pixels. FIG. 9 is an enlarged plan view illustrating the configuration of the dummy pixels. Note that FIG. 8 and FIG. 9 illustrate the dummy pixel region E2 and the peripheral circuit region E3 on the left side of the display region E1 in the X direction in FIG. 4A.

As shown in FIG. 8, in the dummy pixel region E2 between the display region E1 and the peripheral circuit region E3, two dummy pixels DP adjacent to each other in the X direction (a first dummy pixel DP1 and a second dummy pixel DP2) are disposed. The first dummy pixel DP1 is disposed on the peripheral circuit region E3 side.

The pixel electrode 15 formed of a transparent conductive film is disposed, as described before, in the opening region of the pixel P adjacent to the second dummy pixel DP2 in the X direction. Dummy pixel electrodes 15d each formed of, like the pixel electrode 15, a transparent conductive film are also disposed in the respective opening regions of the first dummy pixel DP1 and the second dummy pixel DP2. The pixel electrode 15 is controlled and driven by the TFT 30 that is provided in the intersection portion of the non-opening region located at the lower left of the pixel P. Likewise, the dummy pixel electrode 15d is controlled and driven by the TFT 30 that is provided in the intersection portion of the non-opening region located at the lower left of the dummy pixel DP (first dummy pixel DP1, second dummy pixel DP2).

In this embodiment, the TFT 30 that controls and drives the dummy pixel electrode 15d of the first dummy pixel DP1 is referred to as a first transistor Tr1, the TFT 30 that controls and drives the dummy pixel electrode 15d of the second dummy pixel DP2 is referred to as a second transistor Tr2, and the TFT 30 that controls and drives the pixel electrode 15 of the pixel P adjacent to the second dummy pixel DP2 in the X direction is referred to as a third transistor Tr3.

Three or more dummy pixels DP may be arranged in the X direction in the dummy pixel region E2 between the display region E1 and the peripheral circuit region E3. In this case, the third transistor Tr3 may also control and drive the dummy pixel electrode 15d.

As described before, the image signals (VID1 through VID6) based on the image information are supplied to the pixel electrodes 15 of the pixels P via the data lines 6. Meanwhile, a constant potential is applied to the dummy pixel electrodes 15d. This constant potential is, for example, a potential that provides dark display in the case where the liquid crystal device 100 is in the normally black mode. This makes it possible to make the plurality of dummy pixels DP surrounding the display region E1 function as an electronic parting section.

In addition, in order to further improve the light blocking property for shielding the dummy pixel DP, a first dummy pixel shielding film 17a is disposed in the opening region of the first dummy pixel DP1. Likewise, a second dummy pixel shielding film 17b is disposed in the opening region of the second dummy pixel DP2. Although size of the dummy pixel electrode 15d of the first dummy pixel DP1 is the same as that of the second dummy pixel DP2, size of the opening region of the first dummy pixel DP1 is smaller than that of the second dummy pixel DP2. The size of the opening region of the second dummy pixel DP2 is the same as that of the opening region of the pixel P.

To be more specific, the length of the opening region of the first dummy pixel DP1 in the Y direction is shorter than that of the opening region of the second dummy pixel DP2 in the Y direction. The length of the opening region of the first dummy pixel DP1 in the X direction is the same as that of the opening region of the second dummy pixel DP2 in the X direction. To rephrase, the length of the first dummy pixel shielding film 17a of the first dummy pixel DP1 in the Y direction is shorter than that of the second dummy pixel shielding film 17b of the second dummy pixel DP2 in the Y direction. Further, the length of the first dummy pixel shielding film 17a of the first dummy pixel DP1 in the X direction is the same as that of the second dummy pixel shielding film 17b of the second dummy pixel DP2 in the X direction. In other words, a slit SL with a width Sd having a constant length is provided between the non-opening region and the first dummy pixel shielding film 17a and between the non-opening region and the second dummy pixel shielding film 17b. The length of the width Sd is less than 1 µm.

The scanning line 3 is a line that corresponds to "gate wiring" of this invention; the scanning line 3 extends in the X direction, from the peripheral circuit region E3, between the first dummy pixels DP1 adjacent to each other in the Y direction, and between the second dummy pixels DP2 adjacent to each other in the Y direction, and is provided across the display region E1. The scanning line 3, the first dummy pixel shielding film 17a, and the second dummy pixel shielding film 17b are provided in the same layer on the substrate material 10s of the element substrate 10. Hereinafter, an arrangement relationship between the scanning line 3 and the TFT 30 will be specifically described with reference to FIG. 9.

As shown in FIG. 9, a width L1 of a first portion 3a of the scanning line 3 between the first transistor Tr1 and the second transistor Tr2 adjacent to each other in the X direction is larger than a width L2 of a second portion 3b of the scanning line 3 between the second transistor Tr2 and the third transistor Tr3 adjacent to each other in the X direction. Because the second portion 3b of the scanning line 3 corresponds to the main line portion 3b in the display region E1, the identical reference symbol 3b is assigned thereto.

For example, in the case where lengths in the X direction and Y direction of the pixel P in the opening region are taken as 10 µm, and length of the non-opening region between the pixels P adjacent to each other in the Y direction is taken as 1.5 µm, the width L1 of the first portion 3a of the scanning line 3 is, for example, 7.2 µm while the width L2 of the second portion 3b of the scanning line 3 is, for example, 1.2 µm. It is preferable that the width L1 of the first portion 3a be twice or more as long as the width L2 of the second portion 3b. Note that in FIG. 9, in order to facilitate understanding of the structures of the scanning line 3, the TFT 30, and the like, different scales are appropriately used in the drawings with respect to the actual dimensions.

A length L3 between the slit SL and an end of the gate contact 34 of the first transistor Tr1 of the first dummy pixel DP1 in the Y direction is longer than a length L4 between the slit SL and an end of the gate contact 34 of the second transistor Tr2 of the second dummy pixel DP2 in the Y direction. Note that the gate contact 34 of the first transistor Tr1 corresponds to a first gate contact of this invention, and the gate contact 34 of the second transistor Tr2 corresponds to a second gate contact of this invention.

As described above, for example, in the case where the lengths in the X direction and Y direction of the pixel P in the opening region are taken as 10 μm, and the length of the non-opening region between the pixels P adjacent to each other in the Y direction is taken as 1.5 μm, the length L3 is, for example, 2.4 μm while the length L4 is, for example, 0.25 μm. It is preferable that the length L3 be twice or more as long as the length L4.

Manufacturing Method for Liquid Crystal Device 100

The manufacturing method for the liquid crystal device 100 of this embodiment is as follows.

In the forming of the scanning lines, the scanning line 3 is formed using metal silicide (for example, WSi) so that the width L1 of the first portion 3a of the scanning line 3 between the first transistor Tr1 and the second transistor Tr2 is larger than the width L2 of the second portion 3b of the scanning line 3 between the second transistor Tr2 and the third transistor Tr3.

Further, in the forming of the scanning lines, the first dummy pixel shielding film 17a corresponding to the first dummy pixel DP1 and the second dummy pixel shielding film 17b corresponding to the second dummy pixel DP2 are each formed in an island shape with the slit SL less than 1 μm in length between each dummy pixel shielding film and the scanning line 3.

In the forming of the gate contacts, the gate contacts 34 are formed so that the length L3 between the gate contact 34 of the first transistor Tr1 and the slit SL is longer than the length L4 between the gate contact 34 of the second transistor Tr2 and the slit SL.

In the forming of the gate electrodes, the gate electrode 30g that is connected to the gate contact 34 is formed using a conductive poly-silicon film.

According to the first embodiment of the invention, effects as follows can be obtained.

1. In the dummy pixel region E2 and the peripheral circuit region E3, even if a stress is concentrated in a boundary portion between the dummy pixel region E2 and the peripheral circuit region E3 so as to generate a crack during or after the manufacture of the liquid crystal device 100 due to the arrangement density of transistors as switching elements and wiring connected with the transistors, it is possible to suppress the scanning line 3 from being cut due to the crack because the width L1 of the first portion 3a of the scanning line 3 is larger than the width L2 of the second portion 3b of the scanning line 3. Accordingly, the liquid crystal device 100 can be manufactured at a high manufacturing yield.

2. The first dummy pixel shielding film 17a and the second dummy pixel shielding film 17b are each formed with the slit SL against the scanning line 3 in the same layer as the scanning line 3. This makes it possible to disperse the stress applied to the scanning line 3 in the boundary portion between the dummy pixel region E2 and the peripheral circuit region E3. In addition, because the width Sd of the slit SL is less than 1 μm, the light blocking property for shielding the first dummy pixel DP1 and the second dummy pixel DP2 can be ensured.

3. Because the length L3 between the gate contact 34 of the first transistor Tr1 and the slit SL is longer than the length L4 between the gate contact 34 of the second transistor Tr2 and the slit SL, even if the stress is concentrated in the boundary portion between the dummy pixel region E2 and the peripheral circuit region E3 so as to generate a crack, it is possible to suppress the gate contact 34 on the first transistor Tr1 side from being damaged due to the crack.

4. Because the scanning line 3, the first dummy pixel shielding film 17a, the second dummy pixel shielding film 17b, and the like are formed using metal silicide, the light blocking property against return light can be ensured. In addition, entering light that enters into the dummy pixel region E2 in an oblique direction can be suppressed from being reflected by the scanning line 3, the first dummy pixel shielding film 17a, the second dummy pixel shielding film 17b, and the like. In other words, it is possible to suppress display quality in the display region E1 from being degraded due to return light, oblique light, or the like.

5. Because the gate electrode 30g, which is formed in an upper layer of the semiconductor layer 30a and electrically connected with the scanning line 3, is formed using a conductive poly-silicon film having a low coefficient of thermal expansion, it is possible to suppress a stress from being produced during or after the manufacture of the liquid crystal device 100. In other words, it is possible to suppress a crack from being generated due to the stress being concentrated.

Second Embodiment

Electronic Apparatus

Figure 10:
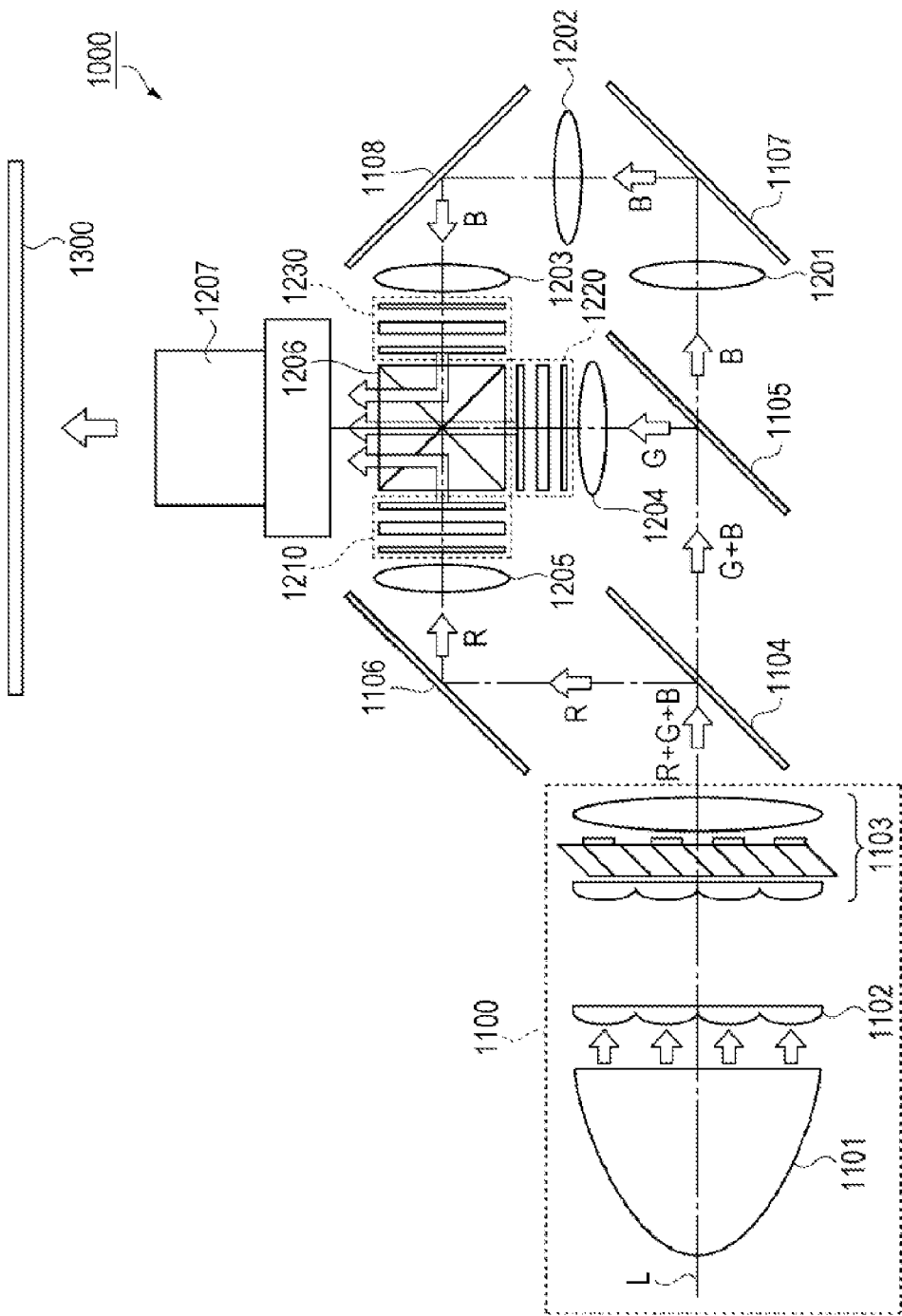
FIG. 10 is a schematic diagram illustrating a configuration of a projection display apparatus.

Next, a projection display apparatus as an electronic apparatus will be described with reference to FIG. 10. FIG. 10 is a schematic diagram illustrating a configuration of a projection display apparatus.

As shown in FIG. 10, a projection display apparatus 1000 as an electronic apparatus according to a second embodiment of the invention includes: a polarization illumination device 1100 disposed along a system optical axis L; two dichroic mirrors 1104 and 1105 as light separation elements; three reflection mirrors 1106, 1107, and 1108; five relay lenses 1201, 1202, 1203, 1204, and 1205; three transmissive liquid crystal light valves 1210, 1220, and 1230 as light modulation units; a cross dichroic prism 1206 as a light combination element; and a projection lens 1207.

The polarization illumination device 1100 is generally configured of a lamp unit 1101 as a light source formed with a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) included in a polarized light flux emitted from the polarization illumination device 1100. The other dichroic mirror 1105 reflects green light (G) and transmits blue light (B) having passed the dichroic mirror 1104.

The red light (R) reflected by the dichroic mirror 1104, after being reflected by the reflection mirror 1106, enters the liquid crystal light valve 1210 via the relay lens 1205.

The green light (G) reflected by the dichroic mirror 1105 enters the liquid crystal light valve 1220 via the relay lens 1204.

The blue light (B) having passed the dichroic mirror 1105 enters the liquid crystal light valve 1230 via a light guide system configured of the three relay lenses 1201, 1202, 1203 and the two reflection mirrors 1107, 1108.

The liquid crystal light valves 1210, 1220, and 1230 are so disposed as to face incidence surfaces of the cross dichroic prism 1206 for respective colors of light. Color light having entered the respective liquid crystal light valves 1210, 1220, and 1230 is modulated based on image information (image signals) and outputted toward the cross dichroic prism 1206. This prism is configured by bonding four rectangular prisms; on the inner surfaces of the prism, a dielectric multilayer film that reflects red light and another dielectric multilayer film that reflects blue light are formed in a cross manner. The three colors of light are combined by these dielectric multilayer films to form light representing a color image. The combined light is projected, by the projection lens 1207 as a projection optical system, onto a screen 1300 in which the image is enlarged and displayed.

The liquid crystal light valve 1210 is a light valve to which the above-described liquid crystal device 100 is applied. A pair of polarization elements is disposed on a color light entering side and a color light output side of the liquid crystal device 100 in a cross Nicol arrangement with a gap therebetween. The same can apply to the other liquid crystal light valves 1220 and 1230.

According to the projection display apparatus 1000, because the liquid crystal device 100 is used for the liquid crystal light valves 1210, 1220 and 1230, the apparatus has a structure such that even if a crack is generated on the element substrate 10 side due to a stress generated during or after the manufacture, the scanning lines 3 are unlikely to be cut, whereby the projection display apparatus 1000 with excellent reliability and quality can be provided.

The invention is not intended to be limited to the aforementioned embodiments, and many modifications can be made thereon without departing from the essential spirit of the invention as set forth in the appended aspects of the invention and the specification as a whole; electro-optical devices derived from such modifications, manufacturing methods for the stated electro-optical devices, and electronic apparatuses to which such electro-optical devices are applied also fall within the technical scope of the invention. Many variations can also be considered in addition to the aforementioned embodiments. Several such variations will be described hereinafter.

First Variation

Such a patterning design concept in the first embodiment that makes the width L1 of the first portion 3a of the scanning line 3 larger than the width L2 of the second portion 3b is not limited to applying to the scanning lines 3 connected with the scanning line driving circuit 102 on the left side in the X direction illustrated in FIG. 2. The above design concept may be applied to the scanning lines 3 connected with the scanning line driving circuit 102 on the right side in the X direction in FIG. 2. In other words, it is preferable to consider the arrangement of transistors in the boundary portion between the dummy pixel region E2 and the peripheral circuit region E3 where the stress is likely to be concentrated and to make the width of the scanning lines 3 connected with those transistors larger based on the consideration.

Second Variation

The wiring structure of the element substrate 10 in the first embodiment is not limited to the structure having the first through six layers. For example, in the case where one of the pair of electrodes of the holding capacitor 16 is configured to function as the capacitor line 4, the capacitor wiring 400 can be omitted.

Third Variation

The arrangement of the TFTs 30 in the first embodiment is not limited to the arrangement discussed therein. For example, even if the semiconductor layer 30a is arranged so as to extend in the X direction with respect to the intersection portion of the non-opening region, the patterning design of the scanning line 3 of this invention can be applied.

Fourth Variation

Electro-optical devices to which the patterning design of the scanning line 3 of the first embodiment can be applied are not limited to the transmissive liquid crystal device 100. For example, the design can be applied to, in addition to liquid crystal devices, active-driving organic electroluminescence devices, electrophoretic devices, and so on.

Fifth Variation

Electronic apparatuses to which the liquid crystal device 100 as an electro-optical device can be applied is not limited to the projection display apparatus 1000 of the second embodiment. The liquid crystal device discussed above can be applied to a projection HUD (head-up display), a direct-view HMD (head-mounted display), or display units of information terminal apparatuses such as an electronic book, a personal computer, a digital still camera, a liquid crystal television, a viewfinder or monitor direct-view video recorder, a car navigation system, an electronic notebook, and a POS terminal, for example.

The entire disclosure of Japanese Patent Application No. 2013-090049, filed Apr. 23, 2013 is expressly incorporated by reference herein.

What is claimed is:

1. An electro-optical device that includes a display region where a plurality of pixels are arranged in a first direction and a second direction intersecting with the first direction, a dummy pixel region including a plurality of dummy pixels that are arranged outside of the display region, and a circuit region that is positioned outside of the dummy pixel region and including a circuit that drives the plurality of pixels, the device comprising:
a first transistor that is positioned in a first dummy pixel, the first dummy pixel being positioned at a position closest to the circuit region;
a second transistor that is positioned in a second dummy pixel adjacent to the first dummy pixel on the opposite side to the circuit region in the first direction;
a third transistor that is positioned adjacent to the second transistor in the first direction; and
a gate wiring extended in the first direction and electrically connected with each of the first transistor, the second transistor and the third transistor,
wherein width in the second direction of a first portion of the gate wiring between the first transistor and the second transistor is larger than width in the second direction of a second portion of the gate wiring between the second transistor and the third transistor.

2. The electro-optical device according to claim 1, further comprising:
a first dummy pixel shielding film for shielding the first dummy pixel from light and a second dummy pixel shielding film for shielding the second dummy pixel from light that are provided in the same layer as the gate wiring, wherein a slit whose width is less than 1 μm is formed between the gate wiring and the first dummy pixel shielding film and between the gate wiring and the second dummy pixel shielding film.

3. The electro-optical device according to claim 2,
wherein a distance between the slit and a first gate contact for electrically connecting a gate of the first transistor to the gate wiring is longer than a distance between the slit and a second gate contact for electrically connecting a gate of the second transistor to the gate wiring.

4. The electro-optical device according to claim 1,
wherein the gate wiring is formed using metal silicide.

5. The electro-optical device according to claim 1,
wherein respective gate electrodes of the first transistor, the second transistor, and the third transistor are formed using a conductive poly-silicon film.

6. An electronic apparatus comprising the electro-optical device according to claim 1.

* * * * *